(12) United States Patent  (10) Patent No.: US 8,849,328 B2
Lin  (45) Date of Patent: Sep. 30, 2014

(54) BASE STATION SHARING

(75) Inventor: Jie Lin, Basingstoke (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 13/262,786

(22) PCT Filed: Apr. 3, 2009

(86) PCT No.: PCT/CN2009/071157
§ 371 (c)(1),
(2), (4) Date: Jan. 12, 2012

(87) PCT Pub. No.: WO2010/111839
PCT Pub. Date: Oct. 7, 2010

(65) Prior Publication Data
US 2012/0034942 A1  Feb. 9, 2012

(51) Int. Cl.
*H04W 72/02* (2009.01)
*H04W 88/10* (2009.01)
*H04L 12/24* (2006.01)
*H04W 92/12* (2009.01)

(52) U.S. Cl.
CPC .............. *H04W 88/10* (2013.01); *H04W 92/12* (2013.01); *H04L 41/042* (2013.01)
USPC ........... 455/507; 455/509; 455/403; 455/560; 455/561

(58) Field of Classification Search
CPC ....... H04W 88/10; H04W 4/00; H04W 72/02; H04W 7/24
USPC ........................... 455/403, 507, 509, 560, 561
See application file for complete search history.

(56) References Cited

U.S. PATENT DOCUMENTS

| | | | |
|---|---|---|---|
| 7,474,751 B2 * | 1/2009 | Zheng | 380/270 |
| 7,957,739 B2 * | 6/2011 | Jeong et al. | 455/436 |
| 8,000,711 B2 * | 8/2011 | Fischer et al. | 455/436 |
| 8,140,083 B2 * | 3/2012 | Fischer et al. | 455/450 |
| 8,300,649 B2 * | 10/2012 | Couaillet et al. | 370/401 |
| 8,364,147 B2 * | 1/2013 | Corem et al. | 455/435.1 |
| 8,406,782 B2 * | 3/2013 | Horneman et al. | 455/452.2 |

(Continued)

FOREIGN PATENT DOCUMENTS

| | | |
|---|---|---|
| CN | 1496659 A | 5/2004 |
| CN | 1567798 A | 1/2005 |

(Continued)

OTHER PUBLICATIONS

CN 101227708 "Ren" (English translation).*

(Continued)

*Primary Examiner* — Bobbak Safaipour
(74) *Attorney, Agent, or Firm* — Brinks Gilson & Lione

(57) ABSTRACT

An improved base station sharing in a radio communication system is disclosed. A logical base station is arranged to share a physical base station in the radio communication system with at least one further logical base station. According to an embodiment of the invention, the logical base station is associated with a control node and with an operation and maintenance node in the radio communication system, wherein the control node and the operation and maintenance node are separate from at least one further control node and at least one further operation and maintenance node being associated with the at least one further logical base station.

13 Claims, 2 Drawing Sheets

(56) References Cited

U.S. PATENT DOCUMENTS

| | | | |
|---|---|---|---|
| 8,457,110 B2* | 6/2013 | Amirijoo et al. | 370/352 |
| 8,509,733 B2* | 8/2013 | Corem et al. | 455/405 |
| 8,521,863 B2* | 8/2013 | Yang | 709/223 |
| 8,538,420 B2* | 9/2013 | Picker et al. | 455/432.1 |
| 2003/0078052 A1 | 4/2003 | Atias et al. | |
| 2004/0105429 A1 | 6/2004 | Anckar et al. | |
| 2004/0185884 A1 | 9/2004 | Marin et al. | |
| 2005/0079854 A1 | 4/2005 | Auth et al. | |
| 2005/0105492 A1 | 5/2005 | Simonsson et al. | |
| 2008/0227441 A1 | 9/2008 | Hermel et al. | |
| 2012/0071184 A1* | 3/2012 | Lin | 455/507 |

FOREIGN PATENT DOCUMENTS

| | | |
|---|---|---|
| CN | 1620833 A | 5/2005 |
| CN | 1863365 A | 11/2006 |
| CN | 1878356 A | 12/2006 |
| CN | 101198150 A | 6/2008 |
| CN | 101227708 A | 7/2008 |
| CN | 101325747 A | 12/2008 |
| EP | 1330133 A1 | 7/2003 |
| WO | WO 2006/040653 A1 | 4/2006 |
| WO | WO 2008/112688 A1 | 9/2008 |
| WO | WO 2010/139112 A1 | 12/2010 |

OTHER PUBLICATIONS

Extended European Search Report issued in corresponding European Patent Application No. 09842496.3, mailed Jul. 16, 2012.

Vodafone, "Impact of Network Sharing on the SON and O&M Design" Agenda Item 6.8, 3GPP TSG-SA5 (Telecom Management) Meeting SA5#54. Orlando, FL, Jun. 25-29, 2007. S5-071278.

$3^{rd}$Generation Partnership Project, "Technical Specification Group Radio Access Network; UTRAN Iur Interface Signalling Transport" (Release 8) 3GPP TS 25.422. v8.0.0, Dec. 2008.

Vodafone, "Proposal for New Work Item 'Remote Control of Electrically Tilting Antennas'" Agenda Item 11.1, 3GPP TSG-RAN3 Meeting #26. Orlando, FL, Jan. 18-22, 2002. R3-020528.

$3^{rd}$Generation Partnership Project, "Technical Specification Group Radio Access Network; UTRAN Overall Description" (Release 8) 3GPP TS 25.401. V8.2.0, Dec. 2008.

$3^{rd}$Generation Partnership Project, "Technical Specification Group Radio Access Network; UTRAN Iub Interface; General Aspects and Principles" (Release 8) 3GPP TS 25.430. v8.0.0, Dec. 2008.

Office Action issued in corresponding Chinese Patent Application No. 200980151994.4, mailed Sep. 29, 2012.

Office Action issued in corresponding Chinese Patent Application No. 200980151994.4, mailed Mar. 11, 2013.

Written Opinion of the International Searching Authority issued in corresponding PCT Patent Application No. PCT/CN2009/071157, mailed Jan. 7, 2010.

International Search Report issued in corresponding PCT Patent Application No. PCT/CN2009/071157, mailed Jan. 7, 2010.

"Sort of New Type Wireless Base-Station—Introduction to Soft Base-Station" CNKI.net, May 31, 2005, 5 pages.

Ying et al., "A Brief Analysis on Solutions to Building New Wireless Base Stations" CNKI.net, Mar. 31, 2006, 6 pages.

Office Action issued in corresponding Chinese Patent Application No. 200980151994.4, mailed Jul. 16, 2013, 15 pages.

* cited by examiner

BASE STATION SHARING

This application is a continuation application of International Application No. PCT/CN2009/071157, filed on Apr. 3, 2009, which is hereby incorporated by reference in its entirety.

FIELD OF THE INVENTION

The present invention relates to a logical base station in a radio communication system the logical base station being arranged to share a physical base station in the radio communication system with at least one further logical base station.

The present invention also relates to an operation and maintenance node in a radio communication system, said radio communication system comprising at least one physical base station being shared by at least two logical base stations.

The present invention also relates to a method of a logical base station in a radio communication system and particularly to a method of associating a logical base station in a radio communication system, said logical base station sharing a physical base station in said radio communication system with at least one further logical base station.

The present invention also relates to a method in an operation and maintenance node of a radio communication system, and particularly a method of associating an operation and maintenance node in a radio communication system, said radio communication system comprising at least one physical base station being shared by at least two logical base stations.

The present invention also relates to a computer program, and a computer program product implementing the methods of the invention.

RELATED ART AND BACKGROUND

Building, expanding, and upgrading radio communication systems, such as a $2^{nd}$ generation system, e.g. a Global System for Mobile communications (GSM) system, or a $3^{rd}$ Generation Partnership Project (3GPP) system, e.g. a Universal Mobile Telecommunications system (UMTS), involves enormous costs when good coverage should be achieved. In order to achieve sufficient coverage over the whole geographical area being covered by the radio communication system, a very large number of base stations have to be built, which is very expensive.

For example, a system operator normally has to provide sufficient coverage for more or less the whole geographical area of a country, in which the system operator provides its services in order to be commercially successful. Especially, in some geographical areas, in which there is relatively low activity in the radio communication system, offering adequate coverage by building a full Radio Access Network (RAN) completely covering that area is rarely profitable.

Thus, in a traditional radio communication system, each communication system operator has to make extensive investments in order to provide sufficient coverage for its customers. Also, when new technologies are rolled out, each system operator has to upgrade its RAN accordingly, which is also costly.

In order to solve these problems, system operators have started to share their RANs with each other. Basically, physical base stations and control nodes in the radio communication system are shared by a number of system operators.

The physical base stations are divided into a number of logical base stations, such that radio resources of such a physical base station are shared by a number of logical base stations. A logical base station is a virtual base station, which can function independently to perform essentially all radio communication functions a physical base station would normally be expected to perform.

Thus, the prior art RAN sharing approach is based on a logical separation of the RAN. The approach supports that Core Networks (CNs) of multiple system operators connect to a single control node in the radio communication system, such as a Base Station Controller (BSC), or a Radio Network Controller (RNC).

More in detail, the prior art RAN sharing solution is based on a logical separation of RAN, which is achieved by assigning specific carriers to individual operators. A Public Land Mobile Network (PLMN) id, which belongs to a specific system operator, is broadcast in the radio carrier or radio carriers being assigned to that specific system operator. Also, the CNs of the multiple system operators can connect to a single control node in the radio communication system, such as a BSC or a RNC, via e.g. Iu flex protocol for 3GPP.

Also, an Element Management System (EMS) is shared by a number of system operators and is managed by a primary system operator. The primary system operator is one of the system operators sharing the RAN. Usually, the primary system operator is the system operator being the owner of the physical nodes of the RAN being shared by the system operators. The other system operators sharing a physical base station are denoted secondary system operators.

The shared EMS facilitates connections to Network Management Systems (NMS) of individual operators. An individual system operator can provide certain Configuration Management (CM) instructions to the shared EMS through their own NMS. The system operator can provide instructions regarding some cell level related parameters, i.e. regarding parameters relating to specific sectors and/or carriers of a base station. However, some of the site level related parameters, i.e. parameters relating to the whole base station, such as Quality of Service (QoS) related parameters, can not be set by individual system operators not being the primary system operator. Also, the shared EMS is managed by the primary system operator.

The prior art sharing solution offers cost advantages due to sharing of expensive hardware and software equipment. However, the prior art solution also has drawbacks regarding control over and flexibility of the shared RAN. In the prior art sharing solutions, a system operator not being a primary operator has a very restricted control over the shared RAN, which is experienced as a problem by the system operators.

SUMMARY

It is an object of the present invention to provide a base station sharing solution that solves the above stated problem.

Thus, embodiments of the present invention aim to provide a base station sharing solution offering more control and flexibility over the shared RAN for all the sharing system operators.

The object can be achieved by a logical base station being associated with a control node and with an operation and maintenance node in the radio communication system, wherein the control node and the operation and maintenance node are separate from at least one further control node and at least one further operation and maintenance node being associated with the at least one further logical base station.

The object can also be achieved by an operation and maintenance node being arranged for being associated with at most one of the at least two logical base stations of each one of the at least one physical base station.

The object can be also achieved by a method of a logical base station and particularly a method of associating a logical base station in a radio communication system, said logical base station sharing a physical base station in said radio communication system with at least one further logical base station, the method comprising the steps of associating the logical base station with a control node and with a operation and maintenance node in the radio communication system, wherein the control node and the operation and maintenance node are separate from at least one further control node and at least one further operation and maintenance node being associated with the at least one further logical base station.

The object is also achieved by a method in an operation and maintenance node and particularly a method of associating an operation and maintenance node in a radio communication system, said radio communication system comprising at least one physical base station being shared by at least two logical base stations, the method comprising the step of associating the operation and maintenance node with at most one of the at least two logical base stations of each of the at least one physical base station.

The object is also achieved by a computer program, and a computer program product implementing the methods of the invention.

According to embodiments of the invention, a logical base station within a shared physical base station does not share its control node and operation and maintenance node with the other logical base stations within that physical node. The concept of non-shared control nodes and operation and maintenance nodes offers a flexible RAN sharing for logical base stations sharing a physical base station, since different configurations of RAN parameters are possible for the different logical bases stations.

Also, total privacy for operating records and statistics can be achieved, since the operation and maintenance node is not shared.

These features are very attractive for a system operator sharing a physical base station with one or more of its competitors, since the system operator here can optimize his logical base station individually for his particular needs, and also can prevent the competitors from accessing his operating data.

Also, by the sharing of the physical base stations in combination with non-sharing of the control nodes and operation and maintenance nodes, embodiments of the system can have further advantages related to cost savings when building or expanding networks, since physical base stations are shared, which of course cuts costs both for expansion of e.g. rural coverage and for increasing capacity in the network. Also, operation costs can be reduced by embodiments of the invention, since costs for site rental, backhaul/core network, and network services can be lowered for the system operators.

Also, from a system operator's point of view, embodiments of the invention can offer a clearly defined ownership for the non-shared control nodes and operation and maintenance nodes, as well as for the logical base stations and the physical base station. Each non-shared entity can be owned by an individual system operator. Also, each of the logical base stations can be owned by an individual operator. The physical base station can be owned and managed by the primary system operator via its primary Operation Maintenance Centre (OMC). This clearly defined ownership of the entities makes negotiations between the system operators more easy to carry out, as well as facilitates bookkeeping procedures, such as asset write downs.

According to an embodiment of the invention, the logical base stations comprise a logical control node interface, which corresponds to a control node interface of a physical base station. This makes the sharing of the physical base stations transparent for the control node, i.e. the control node does not have to be aware of if it is communicating with a physical base station or a logical base station. Therefore, essentially no adaption of the control nodes has to be performed when implementing an embodiment of the invention. Also, since a control node can be associated both with logical base stations and with physical base stations, a large variety of sharing possibilities, and thereby network configurations, can be easily achieved. For instance, partial network sharing, where base station sharing is used in some areas, e.g. rural areas, but not in other areas, e.g. major city areas, can easily be accomplished.

According to various embodiments of the invention, each logical base station is associated with at least one of a non-shared database, and a non-shared network interface. Thus, the logical base stations comprise individual software entities with independent databases. Each of these embodiments offers enhanced system operator privacy for its registers and statistics.

According to a further embodiment of the invention, a transmission link between the logical base stations within the shared physical base station and a shared multiplexer is shared by the logical base stations within that physical base station, such that installation costs can be reduced due to sharing of the relatively expensive transmission link.

Detailed exemplary embodiments and advantages of the logical base station, the operation and maintenance node and the methods for the logical base station and the operation and maintenance node according to the invention will now be described with reference to the appended drawings illustrating some preferred embodiments.

DETAILED DESCRIPTION OF PREFERRED EMBODIMENTS

Figure 1:
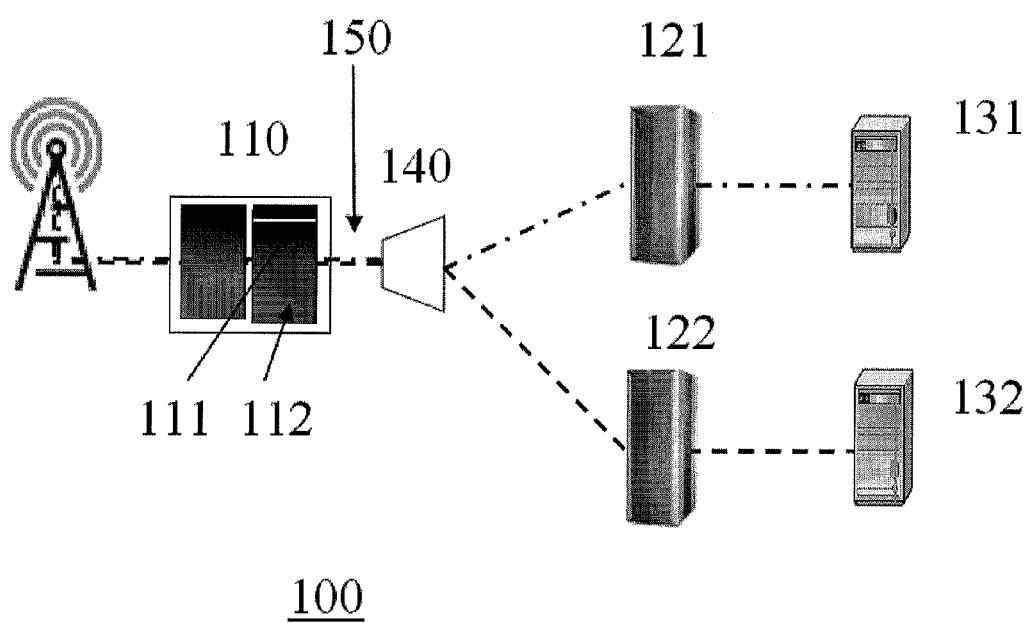
FIG. 1 shows a part of a radio communication system according to an embodiment of the invention.

According to embodiments of the invention, a physical base station is shared by multiple logical base stations by a logical separation. Each logical base station, created within the shared base station, is associated with a control node, which is separate from the one or more control nodes being associated with the further logical base stations sharing the physical base station with that logical base station. Thus, the control node is associated with at most one logical base station within the physical base station. In other words, the control node is not shared by the logical base stations sharing a physical base station.

Correspondingly, according to an embodiment of the invention, each logical base station within the shared physical base station is associated with an operation and maintenance node, which is separate from the one or more operation and maintenance nodes being associated with the further logical base stations sharing the physical base station with that logical base station. Thus, the operation and maintenance node is associated with at most one logical base station within the physical base station, and is not shared by the logical base stations sharing the physical base station.

Thus, a logical base station within a shared physical base station does not share its control node or operation and maintenance node with the other logical base station within that physical node. Since the physical base station includes at least two logical bases stations, this also means that at least two control nodes and at least two operation and maintenance nodes are connected to the shared physical base station. For example, if the physical base station includes three logical base stations, three separate control nodes and three separate operation and maintenance nodes are associated with the three logical base stations within the physical base station, one control node and one operation and maintenance node being associated with each logical base station, respectively.

This makes it possible for the control node to set site level RAN parameters individually for each of the logical base stations within the physical base station, i.e. to achieve a more flexible RAN sharing. Also, according to an embodiment of the invention, the operation and maintenance node obtains full privacy for its operating records and statistics, since the operation and maintenance node is not shared.

These features are especially advantageous for an embodiment of the present invention, for which each one of the logical base stations within the physical base station is operated by a separate system operator. According to this embodiment, each one of the logical base stations sharing the physical base station has full control over its part of the RAN. Especially, RAN parameters for each logical base station can be set by its associated control node, such that the RAN performance can be optimized for the specific needs of that system operator. Thus, both the primary operator and the secondary operators have full control over their parts of the RAN. This is a major improvement from the prior art solutions, in which secondary system operators must follow the radio network strategy being decided by the primary operator, regarding for instance feature software upgrades, RAN performance improvements, and the like.

Also, according to an embodiment of the invention, operating records of the operation and Maintenance node, such as Configuration Management (CM) logs, Fault Management (FM) logs, and Performance Management (PM) data are managed exclusively by the specific system operator being associated to that specific logical base station. Thus, full operation and maintenance node privacy is achieved for each of the different system operators, and not only for the primary system operator as in the prior art solutions.

According to an embodiment of the invention, the sharing of the physical base station by the at least two logical base stations is achieved by that a logical base station shares the radio resources of the physical base station with the other logical base stations sharing the physical base station with it. That is, the radio resources of the physical base station are shared by the logical base stations sharing that physical base station. Thus, radio resources, such as radio frequencies, radio carriers, transmission bandwidths, and spreading codes, as well as other resources, such as base band processing power, are divided between the logical base stations that share the physical base station. Some of these resources, such as the radio resources, are mapped onto dedicated physical resources, while other resources are mapped onto a shared physical resource pool.

Also, logical base stations can have their own dedicated physical resources, such as dedicated radio frequencies or interconnection ports for transmission between the base station and the control node (Iub transmission ports), although it will in most cases share physical resources with other system operators in a common resource pool.

According to an embodiment of the invention, each logical base station within a physical base station is provided with a database being separate from databases of the other logical base stations sharing the physical base station with that logical base station. Thus, each logical base station within a physical base station is provided with a non-shared database.

According to an embodiment of the invention, each logical base station within a physical base station is provided with a network interface being separate from network interfaces for the other logical bases stations of that physical base station, i.e. with a non-shared network interface. The network interface is an interface of the logical base station being used for communicating with either or both of the control node and the operation and maintenance node.

By providing each logical base station with at least one of a non-shared database, and a non-shared network interface, a complete independence and privacy is achieved for the operating records. Thus, private data is guaranteed for traffic of each of the logical base stations, i.e. for each of the system operators, both primary and secondary.

Also, logical separation of the physical base stations, the control nodes, and the operation and maintenance nodes allows flexibility for each individual operator to pursue their own radio network strategy. With N-2 backwards compatibility, i.e. compatibility with two system releases backwards, it is possible for one system operator to enjoy the latest feature set and for another system operator to remain in an older release feature set. Thus, the individual system operators can themselves decide their level of upgrading of his part of the network. A first system operator can, if he wants to, skip one or two upgrades, while a second system operator upgrades his part of the network. The upgrades performed by the second system operator do, according to an embodiment of the invention, not affect the first system operator.

Also, since the system operators do not have shared control nodes or shared operation and maintenance nodes, bookkeeping advantages, e.g. being related to assets write downs, arises. At the same time, the physical base station sharing concept also offers risk sharing between the system operators when building new networks.

In FIG. 1, a part of a radio communication system 100 according to an embodiment of the invention is shown schematically. The radio communication system 100 comprises at least one physical base station 110, at least a first and a second control nodes 121, 122, and at least a first and a second operation and maintenance nodes 131, 132.

The association of the first and second control nodes 121, 122, and the first and second operation and maintenance nodes 131, 132 according to an embodiment of the invention is illustrated in FIG. 1. Each of the first and second logical base stations 111, 112 within a physical base station 110 is associated with a separate one of the first and second control nodes 121, 122, and with a separate one of the first and second operation and maintenance nodes 131, 132, i.e. a first logical base station 111 is associated with a first control node 121 and a first operation and maintenance node 131, and a second logical base station 112 is associated with a second control node 122 and a second operation and maintenance node 132.

According to an embodiment of the invention, each of the first and second logical base stations 111, 112 within the physical base station 110 is associated with one of the first and second control nodes 121, 122 via a multiplexer 140. A transmission link 150 between the first and second logical base stations 111, 112 within the shared physical base station 110 is here shared by the first and second logical base stations 111, 112 within the physical base station. This solution has cost advantages due to use of only a single transmission link instead of one transmission link for each of the first and second logical base stations 111, 112.

In the schematic illustration of FIG. 1, the first and second logical bases stations 111, 112 share the physical base station 110. However, the invention is not restricted to two logical base stations within each physical base station. Essentially any number of logical base stations can share a physical base station. According to an embodiment of the invention, three logical base stations share a physical base station. According to another embodiment of the invention, four logical base stations share a physical base station. The different embodiments having different numbers of logical base stations within the physical base station each has different advantages, being related to the system operator situation, and the traffic situation in the radio communication system.

According to an embodiment of the invention, each logical base station has a logical control node interface, which corresponds to the control nod interface of the physical base station. This has advantages, since sharing of the physical base station thereby is transparent for the control node. That is, the control node does not have to be aware of if it is communicating with a physical base station or a logical base station, since the control node interfaces of the physical base stations and the logical bases stations correspond to each other. Thus, essentially no adaption of the control nodes has to be performed when implementing the solution according to an embodiment of the invention, which has cost advantages.

However, the operation and maintenance nodes are aware of if a base station being associated with it is a physical base station or a logical base station.

Further, according to an embodiment of the invention, operation of the physical base station 110 is managed by the primary system operator, i.e. it is managed by the operation and maintenance node 131 belonging to the primary system operator, e.g. by the primary operation and maintenance node 131. This management comprises e.g. updating and downloading of software, and activation, reset or shutdown of the physical base station 110.

Further, the invention can be implemented in a $2^{nd}$ generation radio communication system 100, such as a system according to the Global System for Mobile communications (GSM), wherein the physical base station 110 is a Base Transceiver Station (BTS), the control node 121, 122 is a Base Station Controller (BSC), and the maintenance node 131, 132 is an Operation and Maintenance Center (OMC). The invention can also be implemented in a system according to 3rd Generation Partnership Project (3GPP), such as an UMTS system, wherein the physical base station 110 is a Node B, the control node 121, 122 is a Radio Network Controller (RNC), and the maintenance node 131, 132 is an Operation Maintenance Centre (OMC).

Figure 2:
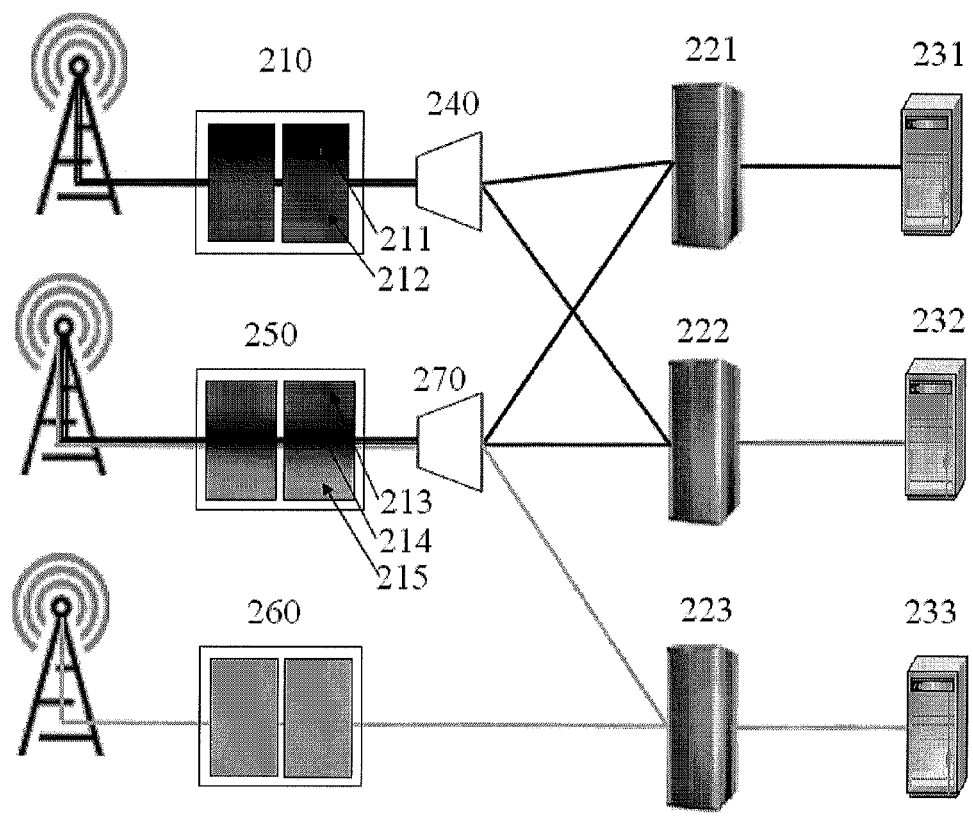
FIG. 2 shows a part of a radio communication system according to an embodiment of the invention.

FIG. 2 schematically illustrates a part of a radio communication system 200 according to an embodiment of the invention, in which a first physical base station 210 is shared by two logical base stations 211, 212, a second physical base station 250 is shared by three logical base stations 213, 214, 215 and a third physical base station 260 is not shared. FIG. 2 will hereafter be used for explaining different embodiments and principles of the invention.

A first control node 221 and a first operation and maintenance node 231 are associated with a first logical base station 211, 213 of each one of the first and second physical base stations 210, 250. A second control node 222 and a second operation and maintenance node 232 are associated with second logical base station 212, 214 of each one of the first and second physical base stations 210, 250. A third control node 223 and a third operation and maintenance node 233 are associated with a third logical base station 215 of the second physical base station 250, and with a non-shared third physical base station 260.

Thus, each of the control nodes 221, 222, 223 is associated with at most one logical base station within each of the physical base stations 210, 250, 260. This also means that a particular logical base station within a physical base station is associated with a control node and an operation and maintenance node being separate from the control nodes and operation and maintenance nodes being associated with the other logical base stations of that physical base station. For example, the first logical base station 211 within the first physical base station 210 is associated with the first control node 221 and the first operation and the first maintenance node 231, which are not associated with another logical base station within the physical base station 210, i.e. which are not associated with the second logical base station 212.

However, the first control node 221 and the first operation and maintenance node 231 are also associated with the first logical base station 213 of the second physical base station 250. Thus, a control node 221 and an operation and maintenance node of an embodiment of the present invention can be associated with at most one logical base station within each of the physical base stations, but may be associated with one logical base station within many physical base stations. This way, a system operator running e.g. the first control node 221 and the first operation and maintenance node 231 can build up coverage for a widespread radio communication network, where physical base stations are shared, if necessary.

Also, if the first control node 221 and the first operation and maintenance node 231 belong to a first system operator, this first system operator has full control of the RAN parameters and also full privacy for the operating records for the first logical base stations 211, 213 within the first and second physical base stations 210, 250.

Correspondingly, a system operator managing the second control node 222 and the second operation and maintenance node 232 has full control of the RAN parameters and record privacy for the second logical base stations 212, 214 within the first and second physical base stations 210, 250.

Also, a system operator managing the third control node 223 and the second operation and maintenance node 233 has full control of RAN settings and record privacy for the third logical base station 215 within the second physical base stations 250, and for the third physical base station 260.

Further, the first and second logical base stations 211, 212 within the first physical base station 210 are associated with their first and second control node and operation and maintenance node, respectively, via a multiplexer, 240, to which they share a transmission link. Correspondingly, the first, second, and third logical base stations 213, 214, 215 within the second physical base station 250 share a transmission link to a multiplexer 270, via which they are associated with their first, second, and third control node and operation and maintenance node, respectively.

Also, since the logical control node interface of the logical base stations corresponds to the control node interface of a physical base station, the third control node 223 can here be associated with both a logical base station 215 of a shared physical base station 250 and with a non-shared physical base station 260. In fact, the third control node 223 is unaware of and makes no difference between if a physical base station is shared or not.

As stated above, the radio communication system 200 can be either a $2^{nd}$ generation radio communication system, such as GSM, or a 3GPP system, such as UMTS, including their respective entities.

Further, an embodiment of the invention also comprises a method of a logical base station sharing a physical base station with at least one other logical base station. According to the method, an association of the logical base station with a control node is performed, where the control node is not shared with the other logical base stations sharing that physical base station with it, i.e. where the control node is different from the further control nodes being associated with further logical base stations of that physical base station. Also, method comprises the step of performing an association of the logical base station with an operation and maintenance node not being shared with the other logical base stations sharing that physical base station with it.

Further, an embodiment of the invention also comprises a method of an operation and maintenance node, wherein an association of the operation and maintenance node with at most one logical base station of a shared physical base station is performed. Thus, the operation and maintenance node is associated such that it is not shared between different logical base stations sharing a physical base station. However, the operation and maintenance node can be associated with more than one logical base station if these logical base stations belong to different physical base stations.

The methods of the invention can be implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A radio communication system, comprising:
a physical base station including at least a first logical base station and a second logical base station;
a first control node associated with the first logical base station;
a second control node associated with the second logical base station; and
a multiplexer connected with both of the first logical base station and the second logical base station via a single transmission link, wherein the first logical base station comprises a first logical control node interface, the second logical base station comprises a second logical control node interface, both the first logical control node interface and the second logical control node interface correspond to a control node interface of the physical base station, the physical base station is connected to both of the first control node and the second control node through the control node interface via the multiplexer, and the first logical control node interface is transparent to the first control node and the second logical control node interface is transparent to the second control node.

2. The radio communication system of claim 1, wherein the first logical base station is operated by a first operator and the second logical base station is operated by a second operator.

3. The radio communication system of claim 1, wherein a set of radio resources of the physical base station is shared between the first logical base station and the second logical base station.

4. The radio communication system of claim 3, wherein the set of radio resources of the physical base station comprises at least one of the resources in the group consisting of: radio frequencies, radio carriers, transmission bandwidths, and spreading codes.

5. A radio communication system, comprising:
a physical base station including at least a first logical base station and a second logical base station;
a first control node associated with the first logical base station;
a first operation and maintenance node (OMN) associated with the first logical base station;
a second control node associated with the second logical base station;
a second OMN associated with the second logical base station; and
a multiplexer connected with both of the first logical base station and the second logical base station via a single transmission link, wherein the first logical base station comprises a first logical control node interface, the second logical base station comprises a second logical control node interface, both the first logical control node interface and the second logical control node interface correspond to a control node interface of the physical base station, the physical base station is connected to both of the first control node and the second control node through the control node interface via the multiplexer, and the first logical control node interface is transparent to the first control node and the second logical control node interface is transparent to the second control node.

6. The radio communication system of claim 5, wherein the first logical base station is operated by a first operator and the second logical base station is operated by a second operator.

7. The radio communication system of claim 5, wherein a set of radio resources of the physical base station is shared between the first logical base station and the second logical base station.

8. The radio communication system of claim 7, wherein the set of radio resources of the physical base station comprises at least one of the resources in the group consisting of: radio frequencies, radio carriers, transmission bandwidths, and spreading codes.

9. A physical base station, comprising:
a first logical base station comprising a first logical control node interface and a second logical base station comprising a second logical control node interface, both the first logical control node interface and the second logical control node interface corresponding to a control node interface of the physical base station,
wherein a set of radio resources of the physical base station is shared between the first logical base station and the second logical base station, the first logical base station is associated with a first control node, the second logical base station is associated with a second control node, both of the first logical base station and the second logical base station are connected to a multiplexer via a single transmission link, and the physical base station is connected to both of the first control node and the second control node through the control node interface via the multiplexer, and the first logical control node interface is transparent to the first control node and the second logical control node interface is transparent to the second control node.

10. A method of associating logical base stations in a radio communication system, the radio communication system comprising a physical base station including at least a first logical base station and a second logical base station, the first logical base station comprising a first logical control node interface, the second logical base station comprising a second logical control node interface, both the first logical control node interface and the second logical control node interface corresponding to a control node interface of the physical base station, the radio communication system further comprising a multiplexer connected with both of the first logical base station and the second logical base station via a single transmission link, the method comprising:
- associating the first logical base station with a first control node; and
- associating the second logical base station with a second control node, wherein both of the first control node and the second control node are connected to the physical base station through the control node interface via the multiplexer, and the first logical control node interface is transparent to the first control node and the second logical control node interface is transparent to the second control node.

11. A method of associating logical base stations in a radio communication system, the radio communication system comprising a physical base station including at least a first logical base station and a second logical base station, the first logical base station comprising a first logical control node interface, the second logical base station comprising a second logical control node interface, both the first logical control node interface and the second logical control node interface corresponding to a control node interface of the physical base station, the radio communication system further comprising a multiplexer connected with both of the first logical base station and the second logical base station via a single transmission link, the method comprising:
- associating the first logical base station with a first control node;
- associating the first logical base station with a first operation and maintenance node (OMN);
- associating the second logical base station with a second control node; and
- associating the second logical base station with a second OMN, wherein both of the first control node and the second control node are connected to the physical base station through the control node interface via the multiplexer, and the first logical control node interface is transparent to the first control node and the second logical control node interface is transparent to the second control node.

12. A non-transitory computer-readable memory having a computer program having code, the code comprising instructions for:
- associating a first logical base station with a first control node; and
- associating a second logical base station with a second control node,
- wherein both of the first logical base station and the second logical base station are included in a physical base station, both of the first logical base station and the second logical base station are connected to a multiplexer via a single transmission link, the first logical base station comprises a first logical control node interface, the second logical base station comprises a second logical control node interface, both the first logical control node interface and the second logical control node interface correspond to a control node interface of the physical base station, and both of the first control node and the second control node are connected to the physical base station through the control node interface via the multiplexer, and the first logical control node interface is transparent to the first control node and the second logical control node interface is transparent to the second control node.

13. A non-transitory computer-readable memory having a computer program having code, the code comprising instructions for:
- associating a first logical base station with a first control node;
- associating the first logical base station with a first operation and maintenance node (OMN);
- associating a second logical base station with a second control node; and
- associating the second logical base station with a second OMN,
- wherein both of the first logical base station and the second logical base station are included in a physical base station, both of the first logical base station and the second logical base station are connected to a multiplexer via a single transmission link, the first logical base station comprises a first logical control node interface, the second logical base station comprises a second logical control node interface, both the first logical control node interface and the second logical control node interface correspond to a control node interface of the physical base station, and both of the first control node and the second control node are connected to the physical base station through the control node interface via the multiplexer, and the first logical control node interface is transparent to the first control node and the second logical control node interface is transparent to the second control node.

* * * * *